United States Patent [19]

Oyafuso

[11] Patent Number: 5,089,736
[45] Date of Patent: Feb. 18, 1992

[54] AUTOMATIC END PLAY ADJUSTMENT OF MOTOR ARMATURE ASSEMBLY

[75] Inventor: Harry H. Oyafuso, Novi, Mich.
[73] Assignee: Ford Motor Company, Dearborn, Mich.
[21] Appl. No.: 692,762
[22] Filed: Apr. 29, 1991
[51] Int. Cl.5 .............................. H02K 15/16
[52] U.S. Cl. ........................... 310/90; 29/596; 310/42; 384/248; 384/903
[58] Field of Search ............... 310/80, 83, 90, 42; 384/246, 248, 903; 29/598, 596

[56] References Cited

U.S. PATENT DOCUMENTS

| | | | |
|---|---|---|---|
| 4,199,861 | 4/1980 | Buckman et al. | 310/42 |
| 4,321,748 | 3/1982 | Ito | 310/42 |
| 4,455,498 | 6/1984 | DeSisto | 310/42 |
| 4,899,432 | 2/1990 | Adam et al. | 310/42 |

Primary Examiner—Steven L. Stephan
Assistant Examiner—Donald Rebsch
Attorney, Agent, or Firm—Peter Abolins; Clifford L. Sadler

[57] ABSTRACT

To adjust axial and radial movement of a thrust plug associated with end play of a rotating shaft, the thrust plug receives the shaft on one side and has a shoulder surface extending from the other side of the thrust plug. A housing position supports a retainer cap which receives the thrust plug so the thrust plug can have some axial movement. The thrust plug shoulder is higher than the thickness of the retainer cap, so that predetermined amount of axial play (c) can be accurately and exactly established. Radial movement of the thrust plug within a housing cavity is achieved by having a thrust plug diameter which is smaller than the inner diameter of the housing cavity, and having an O-ring about the thrust plug which engages the housing cavity and provides a pivot point.

9 Claims, 2 Drawing Sheets

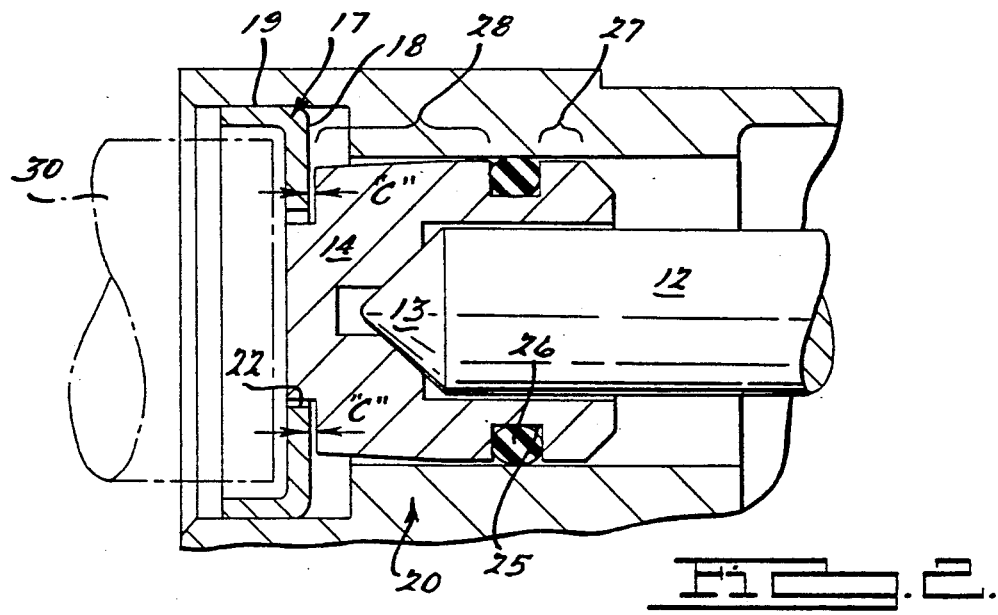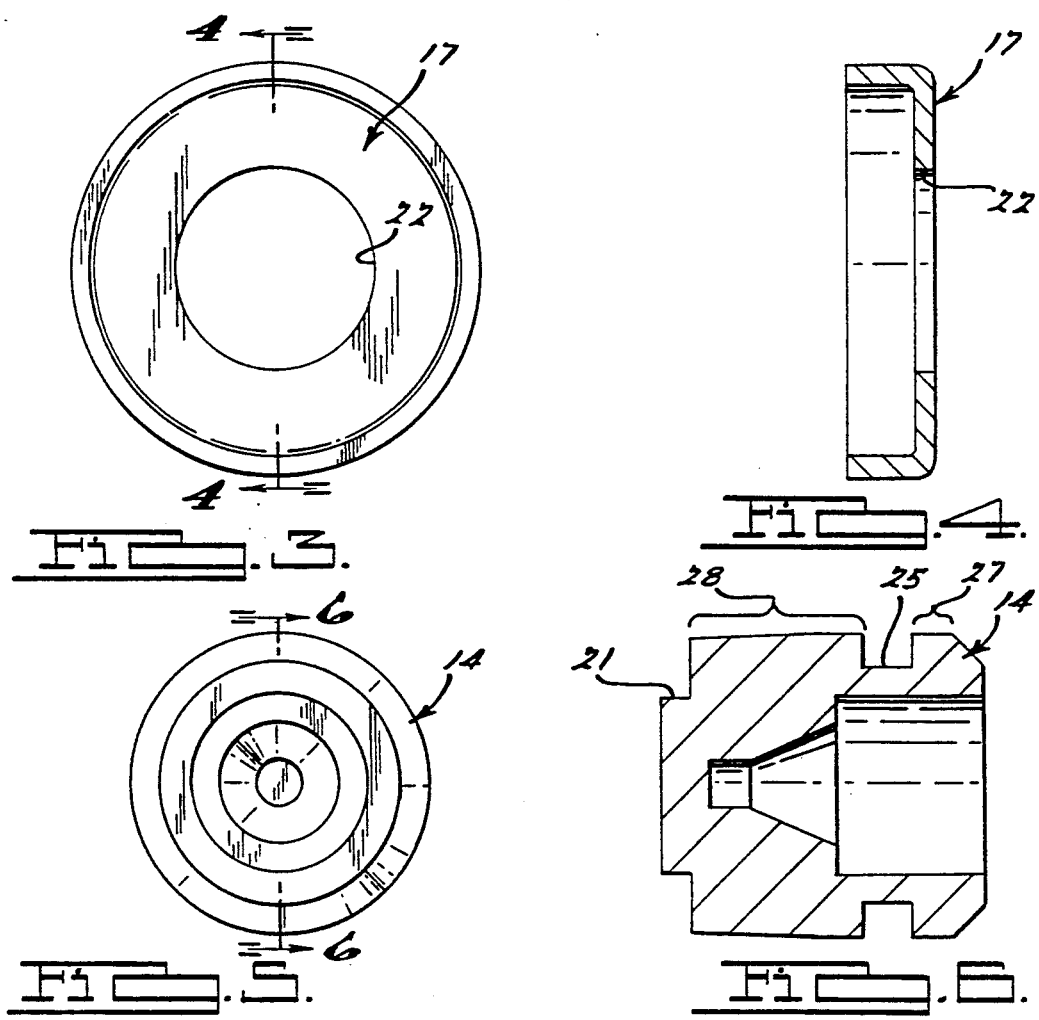

AUTOMATIC END PLAY ADJUSTMENT OF MOTOR ARMATURE ASSEMBLY

BACKGROUND OF THE INVENTION

1. Field of the Invention

This invention relates to rotating devices that require some axial and radial end play for a rotor shaft.

2. Prior Art

There are various known ways of mounting a shaft in an electric motor to provide some axial end play for the shaft. This is done because all rotating devices, such as the armature assembly of a wiper motor, require some shaft end play. Various ways for supporting the end of the shaft include a threaded thrust plug with locking nut, but this is typically relatively time consuming to assemble and is unreliable in operation. Another way is to form an injection molded plastic plug so that clearance is obtained by material shrinkage. However, this does not guarantee a 100% clearance due to shaft run out. Also known are various types of retaining metal clips. These have such problems as stacking of tolerances and relatively complex and expensive assembly components.

It would be desirable to have a self-adjusting thrust plug with a low friction thrust bearing surface which minimizes shaft loss during shaft rotation under high thrust and radial loads. These are some of the problems this invention solves by providing a self-adjusting thrust plug.

U.S. Pat. No. 4,321,748 teaches a thermoplastic material used as an end thrust plug and injection molded into the gear housing and when the thermoplastic material cools it automatically provides a clearance between the end of the armature shaft and the concave surface of the molded plug. The amount of clearance will depend on the resin used. Each resin has its own shrinkage rate which determines the amount of clearance. Using both an injection molding press for the first application and a heating device for the second application add cost to the manufacturing process.

The disadvantage of this concept is that if the shaft is not reasonably straight the shaft will orbit at the end that is in contact with the molded concave bearing surface which in turn will increase frictional drag between the mating surfaces. The frictional drag will in turn reduce the motor efficiency during extremely high wiper motor operating loads such as one would experience when the windshield glass is partially dry. The coefficient of friction between the glass and rubber blades is at maximum during this period.

Alternatively, the end thrust plug may be molded and then placed in the cavity of the gear housing where the legs of the thrust plug act as a spring member after it has been stress relieved. To stress relieve the legs of the thrust plug requires a secondary heating process.

U.S. Pat. No. 4,199,861 teaches using ultrasonic equipment to sonic weld a thermoplastic collar or bushing to the rotor assembly to a predetermined dimension from one end of the main frame. The horn of the sonic welding equipment is designed in a manner such that it uses the main frame of the electric motor as a stop. The thrust collar or bushing will always be sonic welded to a given dimension. After the sonic welding operation the end plate of the motor is assembled to the main frame where a designed clearance will be present.

The end plate assembly relative to the bearing must be controlled within the designed tolerances in order to be able to obtain the desired end play of 0.003 to 0.018 inches. This is the only dimension that needs to be controlled as an assembly.

U.S. Pat. No. 4,455,498 teaches using the frame and frame end cap to set a fixed axial shaft clearance between the front and rear shaft bearings of the motor assembly by pressing a shaft retainer to a fixed position and using an arbor press with a fixed dimension. Regardless of axial stack-up tolerances of the motor components the axial bearing clearance will always be the same or held very tight.

It would be desirable to have automatic retention and adjustment of an armature assembly of a wiper motor without the aforementioned drawbacks. Additionally, it would be desirable to provide some radial end play for the shaft so as to reduce wear due to any radial misalignment.

SUMMARY OF THE INVENTION

Applicant's invention teaches using a steel end cap retainer with a hole in the center which allows the extended boss of a thrust bearing to protrude out of the hole. The thrust bearing and a steel retainer are simultaneously pressed into the gear housing casting bore until the thrust plug makes contact with the tapered end of the shaft. Since the arbor press is flush with the retainer and the top end of the boss of the thrust plug, the retainer will be pressed to a fixed position each time. Because the boss height can be, for example, about 0.002 to 0.005 inches greater than the thickness of the steel retainer the axial shaft clearance between the thrust plug and the single ball at the opposite end of the motor assembly will be automatically set each time, regardless of motor assembly accumulated stack-up tolerances. The armature shaft is used as a reference point, rather than the frame and frame end cap.

The thrust plug has a tapered hole (e.g., 45°) and a designed blind hole to reduce frictional drag between the bearing surfaces of the shaft and the thrust plug. The shoulder height between metal retainer and the thrust plug determines the amount of clearance between the bearing surfaces. In addition, the conical shape bearing surfaces of the end of the shaft and the thrust plug are selected to reduce bearing losses during high separation loads between the gear and the worm shaft. The blind hole in the bottom to the thrust plug allows the sharp tip of the shaft to enter the hole without penetrating the surface of the thrust plug bearing surface. The V-shaped thrust surface of the thrust plug provides a large thrust bearing surface as compared to a steel ball and thrust disc combination. Further, the tapered hole and the 45° point of the armature shaft will minimize shaft rotational losses during high wiper motor loads since the distance between the center of shaft axis to the thrust bearing surfaces are held to a minimum. Rotational shaft losses are held to a minimum if the distance from the center of rotation is held small.

The thrust bearing and the metal retainer are positioned within the inner cavity of a housing. In addition to the aforementioned axial movement of the thrust bearing, radial movement of the thrust bearing is also made possible by having the outer diameter of the thrust bearing smaller than the inner diameter of the axial cavity of the housing. The thrust bearing has a groove for receiving an O-ring which engage both the thrust bearing and the inner diameter of the axial cavity. Thus the O-ring acts as a pivot point for the pivoting of the thrust bearing from the housing. Further, the O-ring seals the axial cavity and does not permit fluid flow across the cavity.

Assembly in accordance with applicant's invention requires no additional equipment other than a pneumatic/hydraulic press with an attachment to push the steel retainer into the hole provided in the die cast housing.

Further, in accordance with applicant's invention axial stack-up dimensions are of little concern since the thrust plug automatically sets the end play of the armature shaft assembly.

BRIEF DESCRIPTION OF THE DRAWINGS

FIG. 2 is an enlarged view of a portion of FIG. 1 showing the mounting of the end of the shaft in accordance with an embodiment of this invention;

FIG. 3 is an end view of a retainer cap in accordance with an embodiment of this invention;

FIG. 4 is a cross-section along section IV—IV of FIG. 4 in accordance with an embodiment of this invention;

FIG. 5 is an end view of a thrust plug retainer in accordance with an embodiment of this invention; and FIG. 6 is a cross-section along section VI—VI of FIG. 5 in accordance with an embodiment of this invention.

DETAILED DESCRIPTION OF THE INVENTION

Figure 1:
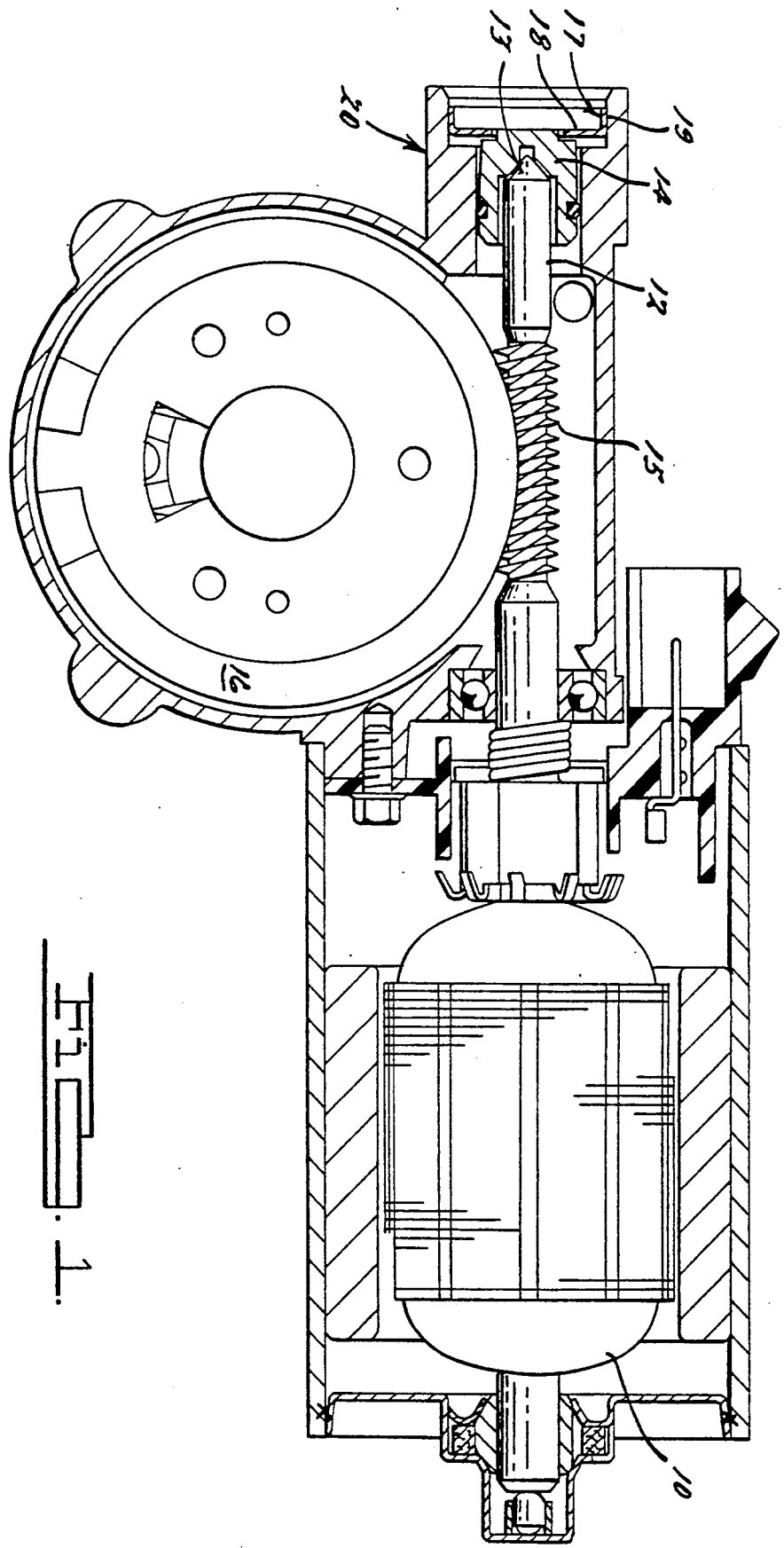
FIG. 1 is a cross-section view of a windshield wiper motor with an armature shaft mounted in accordance with an embodiment of this invention.

Referring to FIG. 1, a windshield wiper rotor 10 is rotationally coupled to an axially aligned armature shaft 12 which has a tapered tip 13 engaging an axial thrust plug 14. Shaft 12 includes a worm gear portion 15 which engages a gear 16. Axial thrust plug 14 abuts a metal retainer cap 17 which has a disk like portion 18 and an annular flange 19 surrounding the disk. A housing 20 supports retainer cap 17, thrust plug 14, gear 16, and rotor 10.

Referring to FIGS. 3 and 5, a retainer cap 17 includes and annular flange 19 and a central opening 22. Central opening 22 is sufficiently large to pass the end of axial thrust plug 14.

Referring to FIG. 2, a desired clearance is additionally obtained during assembly as a result of the dimensions of axial thrust plug 14 and metal retainer cap 17. More specifically, axial thrust plug 14 has a shoulder 21 having a circular width dimension designed to be received within a central opening 22 within steel retainer cap 17. The thickness of metal retainer cap 17 is less than the height of shoulder 21 by an amount to provide the desired clearance. That is, during assembly, an arbor press (shown as dotted outline 30 in FIG. 2) drives axial thrust plug 14 against tapered tip 13 of shaft 12 and positions metal retainer cap 17 adjacent shoulder 21. That is, an adjustment clearance, "C", is obtained when retainer 17 and thrust plug 14 bottoms out against the surface of tapered tip 13 of shaft 12 when pressed by an arbor press.

As a result, this method of assembly automatically adjusts axial end play of armature shaft 12 of a windshield wiper rotor 10, or for that matter, any rotating device that requires some axial end play. All armature assemblies require some end play to reduce frictional losses between the end of the shaft and the axial thrust plug. In addition, assembly in accordance with an embodiment of this invention advantageously uses a low friction molded plastic thrust plug in shaft assembly.

Tapered tip 13 of shaft 12 advantageously has a 45° tapered tip to minimize shaft rotational drag due to the small radius of tapered tip 13. That is, frictional losses become larger if the diameter of the shaft is kept large. Nevertheless, the 45° tapered tip 13 and thrust plug 14 provide a sufficiently large contact area to offset any high axial thrust loads towards axial thrust plug 14.

During wiper motor operation both large radial and axial thrust loads are typically experienced Thrust plug retainer 17 is advantageously a simple metal cap with a hole. To provide sufficient retention forces to hold thrust plug 14 from moving during durability testing, a metal cap is preferred to other types of spring members. Advantageously, the material of the metal cap 17 is a stamped CRLC steel.

The axially self-adjusting feature of the molded plastic thrust plug 14 is the result of the shoulder height on the side of the plug away from shaft 12. When thrust plug 14 and retainer 17 are pressed into a bore of housing 20, tapered tip 13 of shaft 12 bottoms out against thrust plug 14 leaving a clearance of, typically, between 0.001–0.004" between retainer 17 and thrust plug shoulder 21. Since thrust plug 14 can back off at the slightest axial load, it automatically provides the necessary clearance between the thrust plug bearing surface and the end of tapered surface of the armature shaft 12.

Further referring to FIGS. 2 and 6, thrust plug 14 has an annular groove 25 for receiving an O-ring 26. The diameter of portion 27, towards the shaft from O-ring 26, is slightly less than the inner diameter of housing 20. The diameter of section 28 from the O-ring away from the shaft is a diameter which starts off less than the inner diameter of housing 20 and then tapers toward shoulder 21 to provide an even greater clearance. The diameter of O-ring 26 is sufficient so that it extends beyond the outer diameters of either section 28 or 27 and engages the inner diameter of housing 20. Thus, thrust plug 14 can pivot about O-ring 26 to provide for a radial alignment.

Such radial automatic adjustments are particularly advantageous in order to reduce frictional drag between tapered tip 13 of shaft 12 and the internal tapered bearing surface of thrust plug 14. Because of such frictional drag reduction it is possible to use a plastic plug which is a much lower cost than a sintered bronze impregnated with oil which had been necessary when there was a high frictional drag. As a result, by reducing the outer diameter of molded plastic thrust plug 14 and tapering one end of thrust plug 14 and adding a rubber O-ring, it becomes possible for the thrust plug 14 to automatically adjust itself to any axial misalignment of armature shaft 12 which may occur. Testing of this arrangement has shown that a motor, such as a windshield wiper motor, can operate at least about three times longer than previously.

Rubber O-ring 26 serves at least two purposes. First, it is used as a pivot point for thrust plug 14. Thus, thrust plug 14 can tip in the direction of any misalignment of armature shaft 12 thereby aligning itself to tapered tip 13 of armature shaft 12. Secondly, O-ring 26 acts as a seal against water entry along the axial direction of armature shaft 14.

The 45° tapered inside surface of thrust plug 14 provides a relatively small contact area with tapered tip 13 of shaft 12 during extreme heavy separating forces between gear 16 and worm shaft 15. Tapered tip 13 contacts the tapered surface of thrust plug 14 during radial misalignment between armature shaft 12 and thrust plug 14. Since the distance from the axis centerline of shaft 12 to the tapered surface is shorter than a untapered shaft bearing friction losses are reduced considerably. Bearing losses are predominately related to the following relationship $B_L = N^2 D^3 * K$ therefore by keeping the diameter small bearing frictional losses are kept at a minimum, wherein:

N = shaft rpm
K = constant
D = diameter of shaft
$B_L$ = bearing losses

Various modifications and variations may occur to those skilled in the arts to which this invention pertains. For example, the orientation of the gear and shaft may be varied from that disclosed herein. These and all other such variations and modifications come within the scope of the claims appended hereto.

What is claimed:

1. An apparatus for adjusting axial and radial end play of a rotating shaft including:
   a thrust plug with an angled bearing surface for receiving an end of the rotating shaft, and a shoulder extending axially outward from an end of the thrust plug;
   a retainer cap having an opening for receiving the end of the thrust plug with the shoulder, the extension of the shoulder being greater than the thickness of the cap by an amount desired to provide an adjustment clearance; and
   a housing having an axial cavity with an inner diameter for fixing the position of the retainer cap and for permitting axial sliding movement of the thrust plug so as to provide for axial end play.

2. An apparatus for adjusting axial and radial end play of a rotating shaft as recited in claim 1 wherein said thrust plug includes:
   an annular groove for receiving an O-ring;
   a tapering diameter, decreasing in the direction from said groove toward said retainer cap;
   said thrust plug having a constant diameter from said annular groove in a rearward direction away from said retainer cap, said constant diameter being less than the inner diameter of said housing to provide for clearance between a rearward portion of said thrust plug and said housing;
   an O-ring positioned in said groove having a diameter of sufficient size to extend beyond the outer diameter of said thrust plug and engage the inner wall of said axial cavity of said housing, thereby sealing said axial cavity of said housing to prevent flow of water past said O-ring and for providing a pivot point for pivoting of said thrust plug thereby providing for radial adjustment of said thrust plug with respect to said housing.

3. An apparatus as recited in claim 2 wherein:
   said shaft is an elongated cylindrical shaft having a tapered tip with an angle of about 45° at the end for coupling to the thrust plug;
   the thrust plug having a conical bearing surface angled at about 45° for receiving the tapered tip of the shaft;
   the thrust plug having a generally cylindrical exterior shape for fitting within the axial cavity of the housing;
   the bearing surface of the thrust plug having a central opening for receiving the tapered tip of the shaft without contact to the thrust plug;
   the shoulder of the thrust plug having a generally annular shape;
   the retainer cap having a central opening sized sufficiently large to receive the shoulder; and
   the retainer cap having a integral flange surrounding the central disk portion for coupling to the housing and supporting the cap in a fixed position so as to restrain axial movement of the thrust plug upon contact between the shoulder and the retainer cap.

4. A motor assembly including:
   a rotor;
   a rotor shaft extending axially from the rotor;
   a retaining means coupled to the end of the rotor shaft opposite from the rotor for providing an axial end play equal to the difference between the thickness of a retaining disk and the height of a shoulder extending from an end surface of a thrust plug;
   said retaining means including a disk coupled to a housing for establishing a fixed longitudinal position;
   said retaining means including a thrust plug slidably mounted within said housing for longitudinal movement, a first end of said thrust plug engaging the retaining disk to limit movement in a first direction and a second end of said thrust plug engaging the rotor shaft to limit movement in a second direction, opposite from said first direction;
   said thrust plug having a shoulder portion with an end extending through said retaining disk to align with the surface of said retaining disk when the second end of said thrust plug is in contact with the rotating shaft; and
   said thrust plug having a ledge surface at the base of the shoulder, the ledge surface being spaced from the disk by an axial play amount "C" when the thrust plug is in contact with the rotating shaft 5. A motor assembly as recited in claim 4 wherein:
   said thrust plug includes an annular groove for receiving an O-ring;
   said thrust plug having a forward portion tapering from a first diameter which is less than an inner diameter of said housing to a second diameter which is smaller than said first diameter;
   said thrust plug having a rearward portion rearward of said groove having a third diameter which is less than the inner diameter of said housing;
   an O-ring inserted in said groove extends beyond the second and third diameters of said thrust plug and engages the inner diameter of said housing, thereby acting as a pivot point for radial movement of said thrust plug to adjust for any radial misalignment of said rotor shaft.

6. A motor assembly having a rotor shaft as recited in claim 5 wherein:
   said retaining disk is a formed stamped CRLC steel and has a generally annular shape with an angled circular flange extending around the periphery of the retaining disk for engaging the housing and positioning the disk with respect to the housing.

7. A motor assembly having a rotor shaft as recited in claim 6 wherein:
   said thrust plug has a shoulder portion for extending through said retaining disk, the height of the shoulder being equal to the thickness of the retaining disk plus the amount of axial play desired for the rotor shaft;

the shaft having a tapered tip of about 45°; and said thrust plug having a conical surface, at an angle of about 45°, for engaging the tapered shaft tip, and the conical surface having a central opening for passing the tip of the rotating shaft.

8. An apparatus for adjusting axial and radial end play of a rotating shaft including:
- a thrust plug with an angled bearing surface for receiving an end of the rotating shaft, and a shoulder extending axially outward from an end of the thrust plug;
- a retainer cap having an opening for receiving he end of the thrust plug with the shoulder, the extent of the shoulder being greater than the thickness of the cap by an amount desired to provide adjustment clearance;
- a housing having an axial cavity with an inner diameter for fixing the position of the retainer cap and for permitting axial sliding movement of the thrust plug so as to provide for axial end play;
- said thrust plug including an annular groove for receiving an O-ring, and a tapering diameter, decreasing in the direction from said groove toward said retainer;
- said thrust plug having a constant diameter from said annular groove in a rearward direction away form said retainer cap, said constant diameter being less than the inner diameter of said housing to provide for clearance between a rearward portion of said thrust plug and said housing;
- an O-ring positioned in said groove having a diameter of sufficient size to extend beyond the outer diameter of said thrust plug and engage the inner wall of said axial cavity of said housing, thereby sealing said axial cavity of said housing to prevent flow of water past said O-ring and for providing a pivot point for pivoting of said thrust plug thereby providing for radial adjustment of said thrust plug with respect to said housing.

9. An apparatus for adjusting axial and radial end play of a rotating shaft including:
- a housing with an elongated opening;
- a thrust plug positioned within said housing, said thrust plug having a shaft cavity for receiving a rotating shaft and having a limited amount of axial movement away form said shaft as defined by the extent a protruding shoulder extends through a central clearance hole in a fixed retaining cap;
- said retaining cap being fixed with respect to said housing and said alignment between said retaining cap and said thrust plug extension being established during assembly, said thrust plug being free to move a predetermined amount beyond said retaining cap as defined by the shoulder;
- said thrust plug further being free to pivot within the housing to provide for a radial alignment with the rotating shaft;
- said thrust plug having a groove for receiving an O-ring;
- an O-ring being positioned in said grove and providing a pivot point for said thrust plug and said thrust plug having an outer diameter smaller than the extension of the O-ring beyond said thrust plug so that said O-ring can engage the inner diameter of the housing and there can be pivotal motion by said thrust plug within said housing.

* * * * *